United States Patent [19]

Wynne et al.

[11] 4,132,842
[45] Jan. 2, 1979

[54] SILICON-PHTHALOCYANINE-SILOXANE POLYMERS

[75] Inventors: Kenneth J. Wynne, Falls Church, Va.; John B. Davison, Amherst, N.Y.

[73] Assignee: The United States of America as represented by the Secretary of the Navy, Washington, D.C.

[21] Appl. No.: 880,514

[22] Filed: Feb. 23, 1978

[51] Int. Cl.$^2$ ............................................. C08G 77/04
[52] U.S. Cl. ................................... 528/33; 260/314.5; 528/10; 528/38; 528/44
[58] Field of Search ................. 260/46.5 E, 314.5; 528/33, 10, 38, 44

[56] References Cited

U.S. PATENT DOCUMENTS

| | | | |
|---|---|---|---|
| 3,094,536 | 6/1963 | Kenney et al. | 260/314.5 |
| 3,671,489 | 6/1972 | Barnes et al. | 260/46.5 E |
| 3,730,950 | 5/1973 | Barnes et al. | 260/46.5 E |
| 3,993,631 | 11/1976 | Griffith et al. | 260/78 TF |
| 3,996,196 | 12/1976 | D'Alelio | 260/46.5 E |

OTHER PUBLICATIONS

Esposito et al., Inorg. Chem., 5, 1979, 1983 (1966).
Davison et al., Tech. Report No. 1 of Project No. NR 356-590, N00014-75-C-0693, Mar. 1977.

Primary Examiner—Melvyn I. Marquis
Attorney, Agent, or Firm—R. S. Sciascia; Philip Schneider; Thomas McDonnell

[57] ABSTRACT

A silicon-phthalocyanine-siloxane polymer having the formula

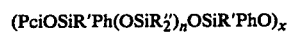

$(PcIOSiR'Ph(OSiR''_2)_nOSiR'PhO)_x$ wherein Pc is a phthalocyanine nucleus, Ph is a phenyl group, n is an integer from 1 to 8, and x is an average value up to 20, is prepared by a method including a reaction of a phthalocyanine-silicon-disilanol with a bis(ureido) dialkyl silane or bis(ureido) siloxane or by the reaction of a phthalocyanine-silicon-disilanol with a bis(dialkyl) amino) silane or a bis(dialkylamino) siloxane. These polymers are useful as strengthening agents for high-temperature resins, such as polyimides, poly(phthalocyanines) or epoxies and as coatings or dyes.

5 Claims, No Drawings

SILICON-PHTHALOCYANINE-SILOXANE POLYMERS

BACKGROUND OF THE INVENTION

The present invention pertains generally to inorganic polymer synthesis and in particular to highly thermally stable silicon containing thermoplastic polymers.

A number of modified siloxane polymers have been prepared. Although polymers based on poly(dimethyl siloxane) offer uncommonly good thermal stability, the polymer backbone tends to form a helical structure which aids in the formation of cyclic siloxanes at elevated temperatures. In order to prevent cyclic formation, siloxane copolymers with modified backbones are synthesized by the addition of organic and inorganic groups. These groups inhibit the reversion to cyclics through steric and/or electronic effects, and improve the thermal stability. Examples of such copolymers are arylene-siloxane copolymers, e.g., $(-OSi(CH_3)_2C_6H_4Si(CH_3)_2SiR_2-)_x$ and carborane-siloxane copolymers.

Phthalocyanines display several useful properties which would make their incorporation into siloxane polymers valuable in addition to preventing cyclic formation. In general, phthalocyanine compounds are noted for their intense colors and high thermal stabilities. It is expected that siloxane polymers containing a phthalocyanine nucleus would be useful as dyes, coatings, and toughening agents for highly thermally stable resins such as polyimides and poly(phthalocyanines). Unfortunately, the known siloxane-phthalocyanine copolymers are insoluble, nonmeltable, and noncrosslinkable. Their insolubility seriously limits workability and their usefulness as coatings. Their nonmeltability and noncrosslinkability prevents their use as strengthening agents. Consequently, these compounds have been little more than laboratory curiosities.

SUMMARY OF THE INVENTION

It is therefore an object of this invention to synthesize siloxane-phthalocyanine copolymers having high solubility in organic and polar solvents.

Another object of the present invention is to synthesize siloxane-phthalocyanine copolymers which are meltable and crosslinkable.

Another object of the present invention is to provide novel and improved strengthening agents for thermally stable resins.

A further object of this invention is to provide a novel class of coating compounds.

A still further object of this invention is to provide a novel class of dyes.

These and other objects are achieved by polymerizing siloxane-phthalocyanine disilanols with appropriate comonomers to produce a copolymer with phenyl and alkyl substituents on the silicon adjacent to the phthalocyanine nucleus, thereby providing through lack of symmetry a lattice energy lower than that of a copolymer with identical substituents on the silicon adjacent to the phthalocyanine nucleus.

DETAILED DESCRIPTION

The polymers of the present invention have the structural formula:

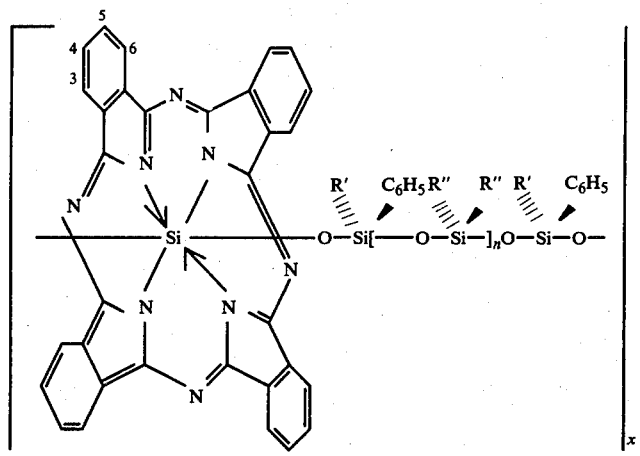

The preparation of these compounds is disclosed by two methods. The first method involves the reaction of a phthalocyanine-silicon-disilanol with a bis(ureido) dialkyl silane or a bis(ureido) siloxane. This method has been reported in Davison, John B. and Wynne, Kenneth J. *Silicon-Phthalocyanine Siloxane Polymers: Synthesis and $^1$H Nuclear Magnetic Resonance Study.* U.S. Navy Technical Report, No. 1, ONR Control N00014-75-C-0693, Mar. 1977. The report is incorporated herein by reference. The second method involves the reaction of a phthalocyanine-silicon-disilanol with a bis(dialkylamino) silane or a bis(dialkylamino) siloxane.

By the "ureido" method, these polymers are prepared by the following reactions as schematically shown below wherein Pc represents a phthalocyanine nucleus, Ph represents a phenyl group, Ur represents a ureido group having the formula:

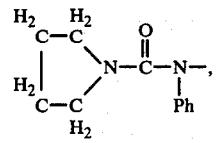

and py represents pyridine,

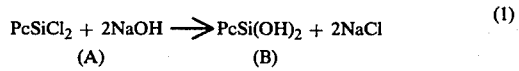

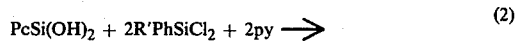

-continued $$\text{PcSi(OSiR'PhCl)}_2 + \text{pyHCl} \quad (3)$$
(C)

$$\text{PcSi(OSiR'PhCl)}_2 + 2\text{H}_2\text{O} \longrightarrow$$
(C)

$$\text{PcSi(OSiR'PhOH)}_2 + 2\text{HCl}$$
(D)

The oxysilicon substitutent on the phthalocyanine silicon of the phthalocyanine-siloxane disilanol may be extended to include additional oxydialkylsilicon units which increase the solubility of the compound. The additional units allow the preparation of the phthalocyanine-siloxane copolymer of this invention from a bis(ureido) siloxane with fewer oxydialkyl-silicon units. Overall the practical upper limit for chain extension appears to be three oxydialkylsilicon units, but four would be useful if exceptionally high solubility were desired. The preparation of these disilanols with oxydialkyl-silicon units is now schematically shown.

$$\text{PcSi(OSiR}^1\text{PhOH)}_2 + 2\text{R}_2^2 \text{SiCl}_2 + 2\text{py} \longrightarrow \quad (4)$$
(D)

$$\text{PcSi (OSiR}^1\text{PhOSiR}_2^2 \text{Cl})_2 + 2\text{py HCl}$$
(E)

$$\text{PcSi(OSiR}^1\text{PhOSiR}_2^2 \text{Cl})_2 + \text{H}_2\text{O} \longrightarrow \quad (5)$$
(E)

$$\text{PcSi(OSiR}^1\text{PhOSiR}_2^2\text{OH})_2 + \text{HCl}$$
(F)

As reactions (4) and (5) are repeated, additional units are added. Thus the disilanols may be represented as:

$$\text{PcSi(OSiR'Ph)} \quad (\text{OSiR}_2'')_p(\text{OH})_2$$
(DF)

wherein p is an integer from 0 to 4. The preferred disilanols are those with p equal 0 to 1, which are compounds D and F respectively.

The above disilanols are reacted with a bis(ureido)-siloxane comonomer having the formula: $\text{UrR}_2^3 \text{Si(O-SiR}_2^4)_q \text{Ur}$ wherein q equals 0–4, to obtain the polymers of this invention. The bis(ureido)compounds may be prepared by the method of Hedaya, et al. (*D2-meta-Carborane-Siloxanes. IV. Syntheses of Linear, High Molecular Weight Polymers* in J. Poly. Sci. Polym. Chem. 15(9) p. 229 -(1977). The polymerization reactions are now schematically shown in (6) and (7).

$$\text{PcSi(OSiR}^1\text{Ph(OSiR}_2^2)_p\text{OH})_2 + 2\text{UrR}_2^3\text{Si(OSiR}_2^4)_q\text{Ur} \longrightarrow \quad (6)$$
(DF) (G)

$$\text{PcSi(OSiR}^1\text{Ph(OSiR}_2^2)_p(\text{OSiR}_2^4)_q(\text{OSiR}_2^3\text{Ur})_2 + 2\text{UrH}$$
(H)

Formula H may be rewritten as:

$$\text{PcSi(OSiR'Ph(OSiR}_2'')_r\text{Ur})_2$$

wherein r is an integer from 1 to 4 (p+q+1) and preferably 1 or 2, R' and R" are alkyls having from 1 to 8 carbon atoms and preferably are methyl, ethyl, or propyl groups. The formula DF for the disilanol monomers can be rewritten in a similar form and becomes: $\text{PcSi(OSiR'Ph(OSiR}_2'')_p\text{OH})_2$ wherein p is an integer from 0 to 4 and preferably from 0 to 2, and R' and R" are alkyl groups having from 1 to 8 carbon atoms and preferably are methyl, ethyl or propyl groups.

$$\text{PcSi(OSiR'Ph(OSiR}_2'')_r\text{Ur})_2 + \quad (7)$$
(H)

$$\text{PcSi(OSiR'Ph(OSiR}_2'')_p\text{OH})_2 \longrightarrow$$
(DF)

$$(\text{PcSiOSiR'Ph(OSiR}_2'')_n\text{OSiR'PhO})_x + \text{UrH}$$
(I)

wherein n is an integer from 1 to 8 (equals r + p), and x which represents the average degree of polymerization may range from 1 to 20. The preferred value for n is 1, 2, 3, or 4.

In practice reactions 6 and 7 occur together and reaction 7 is the completion of the polymerization process if the molar amount of the disilanol is approximately equal to the amount of bis(ureido) siloxy monomer. The overall reaction is represented by (8)

$$\text{PcSi(OSiR}^1\text{Ph(OSiR}_2^2)_p\text{OH})_2 + \text{UrR}_2^3\text{Si(OSiR}_2^4)_q\text{Ur} \longrightarrow \quad (8)$$
(DF)

$$[\text{PcSiOSiR}^1\text{Ph(OSiR}_2^2)_p\text{OSiR}_2^3(\text{OSiR}_2^4)_q(\text{OSiR}_2^2)_p\text{OSiR}^1\text{PhO}]_x + \text{UrH}$$
(I)

Note that I is written in a different way in equation (8), but this representation is equivalent to that in equation 7 as $n = 2p + q + 1$.

The silicon-phthalocyanine-siloxane polymers of this invention may also be prepared utilizing bis(amino) silane comonomers in place of bis(ureido) silane and bis(ureido) siloxane comonomers. The reaction utilizing bis(amino) comonomers is now schematically shown:

$$(\text{PcSi(OSiR}^1\text{Ph(OSiR}_2^2)_p\text{OH})_2 + \text{R}_2^6\text{NR}_2^3\text{Si(OSiR}_2^4)_q\text{NR}_2^6 \longrightarrow \quad (9)$$

$$[\text{PcSiOSiR}^1\text{Ph(OSiR}_2^2)_p\text{OSiR}_2^3(\text{OSiR}_2^4)_q(\text{OSiR}_2^2)_p \text{OSiR'PhO}]_x + \text{R}_2^6\text{NH}$$

Note that p and q have the same ranges and preferred ranges as noted above. The value of x for this route is an average value and may range from 1 to 20. $R^1$, $R^2$, $R^3$, and $R^4$ are alkyl groups having from 1 to 8 carbon atoms and preferably are methyl, ethyl or propyl groups. $R^6$ is an alkyl group having 1–3 carbon atoms and preferably is a methyl group.

The following examples are given to demonstrate the preparation of the polymers of this invention. It is understood that these examples are given by way of illustration and are not meant to limit the disclosure or the claims to follow.

The ir spectra of all compounds were recorded in KBr pressed pellets on a Perkin Elmer Model 467 spectrometer. The photon nmr spectra were recorded on a JEOLCO PS-100 spectrometer. Samples were 20–30% solutions by weight in CDCl$_3$ with 1% TMS as internal standard; chemical shifts are reported in p.p.m. vs. TMS($\delta$). Melting points were determined on a Fisher-Johns apparatus and are uncorrected. The melting points of moisture sensitive compounds were determined in sealed capillaries on an Electrothermal melting points apparatus. Elemental analyses were performed by Gailbraith Laboratories, Knoxville, Tenn. Because the ureido compounds are moisture sensitive, all operations with these compounds were carried out under an atmosphere of dry nitrogen. All solvents and reactants used in this work were dried by standard methods and freshly distilled under nitrogen or reduced pressure prior to use. Solution viscosities ($\eta_{red}$) were obtained in chloroform at 20° using a Cannon-Ubbelhode viscometer. All temperatures are in degree Celsius.

1. PcSiCl$_2$    (A)

Silicon tetrachloride (150 g. 0.883 mol) was allowed to react with 1,3-diiminoisoindoline (88 g. 0.607 mol) in 300 ml of tributylamine and 700 ml of tetralin at reflux for 2 hours. The purple crystalline product (73.8 g. 0.120 mol, 80% based on 1,3-diiminoisoindoline) was identified as PcSiCl$_2$ by ir and elemental analysis.

2. PcSi(OH)$_2$    (B)

The basic hydrolysis of PcSiCl$_2$ to PcSi(OH)$_2$ was carried out as previously described. In a 2 liter flask, PcSiCl$_2$(44.0 g. 71.1mmol), NaOH (11 g. 275mmol), H$_2$O (1 liter), and pyridine (260 ml) were refluxed for 1 hour. The product (41.2 g. 71.7 mmol, 100%) was recovered by filtration, washed with water, and dried in vacuo. The compound was identified as PcSi(OH)$_2$ by its ir spectrum and elemental analysis.

3. PcSi(OSiR PhCl)$_2$ wherein R is a methyl group (C)

PcSi(OH)$_2$ (13.50 g, 46.8 mmol) was placed in a 500 ml 3-neck flask along with a magnetic stir bar. The flask was fitted with a serum cap, an inlet for dry nitrogen gas, and a gas outlet tube and bubbler. The flask was then throughly purged with dry nitrogen. While a gentle nitrogen purge was maintained, 225 ml of pyridine and 36 ml of tributylamine were added to the flask. Finally, methylphenyldichlorosilane (25 ml, 160 mmol) was injected into the reaction flask with a syringe. A slow nitrogen purge was maintained as the mixture stirred at room temperature for 8 days. The solution was then filtered and the solid obtained was dissolved in 1.2 liters boiling toluene. The hot solution was filtered to remove unreacted PcSi(OH)$_2$. The filtrate was reduced to about 800 ml by continued boiling and finally cooled at 0° for 24 hrs. The product, PcSi(OSiMePhCl)$_2$(C) which separated as lustrous dark purple needles (14.93 g, 16.89 mmol, 72.2%) was removed by filtration, washed with 100 ml dry heptane, and vacuum dried. The melting point of freshly recrystallized compound C is 292.3°, but the compound is sensitive to atmospheric moisture and will slowly hydrolyze in air (m.p. after 7 days was 282°). The bands in the ir spectrum of compound C are: 1611w, 1523m, 1475, 1430s, 1337vs, 1294s, 1260m, 1169m, 1125vs, 1045vs(broad), 915m, 785w, 765m, 735vs, 700m, 571m, 531m, 500m (Si—Cl stretch), 475w, 427w, ANAL. Calcd for C$_{46}$H$_{32}$N$_8$O$_2$Si$_3$Cl$_2$: C, 62.50; H, 3.65. Found, C, 63.58; H, 4.03.

4. PcSi(OSiR$^1$PhOH)$_2$ wherein R$^1$ is a methyl group (D)

Crystals of compound C (14.93 g, 16.89 mmol) were placed in a 250 ml flask along with 150 ml of dioxane, 6 ml of pyridine, 6 ml of water, and a magnetic stir bar. After stirring overnight at ambient temperature, the solution was poured slowly into 2.5 liters of rapidly stirred water. The blue solid, PcSi(OSiMePhOH)$_2$ compound D, was removed by filtration and dried at 100° C. (14.15 g, 16.70 mmol, 98.9%, m.p. > 380°). The bands in the ir spectrum of IB are: 3430w (broad), 3062w, 1612w, 1593w, 1522m, 1464w, 1432m, 1357w, 1338vs, 1296s, 1262m, 1173m, 1128s, 1087s, 1052s, 919m, 860w, 768m, 744s, 706w, 578m, 538m, 483w, 432w, 419w, 320vw. ANAL. Calcd for C$_{46}$H$_{34}$N$_8$O$_4$Si$_3$: C, 65.22; H, 4.05; Si, 9.95. Found, C, 65.31; H, 4.18; Si, 10.11.

5. PcSi(OSiR$^1$ PhOSiR$_2$$^2$ Cl)$_2$ wherein R$^1$ and R$^2$ are methyl groups    (E)

Dimethyldichlorosilane (0.28 g, 2.47 mmol), 25 ml of benzene, and 0.5 ml of dry pyridine were placed in a 100 ml 3-neck flask equipped with a nitrogen gas inlet, drying tube outlet, stopper, and magnetic stir bar. With a nitrogen purge, a solid addition tube containing compound D PcSi(OSiMePhOH)$_2$, (1.00 g, 1.18 mmol) was substituted for the stopper. While the solution stirred, small amounts of compound D were gradually added to the reaction mixture. Preliminary nmr experiments revealed that the reaction between compound D and dimethyldichlorosilane in the presence of pyridine is quite rapid. The product of this reaction, PcSi(OSiMePhOSiMe$_2$Cl)$_2$, was observed via nmr spectroscopy but the compound was not isolated.

6. PcSi(OSiR$^1$PhOSiR$_2$$^2$OH)$_2$ wherein R$^1$ and R$^2$ are methyl groups    (F)

The solution of PcSi(OSiMePhOSiMe$_2$Cl)$_2$ prepared as described in 5 was stirred for 20 min. at room temperature whereupon 3 ml of water was added and the mixture stirred another hr. The reaction mixture was extracted with 50 ml of water, and the organic phase was collected and allowed to evaporate in the hood. The residue was dissolved in 5-10 ml of dichloromethane and added dropwise to 200 ml of stirred ligroin. After the solution had partly evaporated, some solid material precipitated. This solid was removed by filtration and the filtrate was allowed to evaporate slowly over a period of 1-2 days. Small dark purple crystals of PcSi(OSiMePhOSiMe$_2$OH)$_2$, (F) (0.69 g, 0.69 mmol, 58.5% mp., 168-9°) were deposited. It should be noted that compound F was difficult to obtain pure due to the presence of side products of similar solubility. The bands in the ir spectrum of compound F are: 3440w, 3078w, 2968w, 2599w, 1615w, 1594w, 1526s, 1477m, 1435s, 1360m, 1340vs, 1298s, 1263s, 1172m, 1128vs, 1087vs, 1033vs (broad), 920m, 885w, 792m, 769m, 740vs, 707m, 567m, 533m, 479w, 430w, ANAL. Calcd for C$_{50}$H$_{46}$N$_8$O$_6$Si$_5$: C, 60.33; H, 4.66; Si, 14.11. Found, C, 60.47: H, 4.70; Si, 13.98.

7. UrR$_2$$^3$Si(OSiR$_2$$^4$)$_q$ Ur wherein R$^3$ is a methyl group and q equals 0    (G-0)

Bis(N-Pyrrolidino-N'-phenyluredio)dimethylsilane

This compound was synthesized in a two-step process. A 5 liter 3-neck flask was equipped with a mechanical stirrer, a 250 ml pressure equalizing dropping funnel, and a low temperature condenser with an outlet to the atmosphere through a drying tube. In place of a stopper, the top of the dropping funnel was fitted with an inlet for dry nitrogen gas. A brisk nitrogen purge of the apparatus was maintained for 30 minutes before 1.3 liters of ethyl ether and 2 moles of butyl lithium (2.4 M in hexane) were added to the flask. The flask was cooled in an ice bath and Dry Ice and acetone were added to the low temperature condenser. Pyrrolidine (142 g, 2 mol) was placed in the dropping funnel and added dropwise with stirring to the lithio solution.

The cooling baths and nitrogen purge were maintained until all the dimethyldichlorosilane had been added. The reaction mixture was allowed to reach room temperature and stirred overnight under nitrogen. Following removal of of lithium chloride by filtration under nitrogen the product, bis(pyrrolidinyl)dimethylsilane, was obtained by fractional distillation (153.5 g, 0.774 mol, 77% b.p., 105°/15.5 mm). Bis(pyrrolidinyl)dimethylsilane (55.0 g, 0.278 mol) and ethyl ether (150 ml) were placed in a 500 ml flask fitted with a nitrogen gas inlet, a mechanical stirrer, and a dropping funnel with a drying tube gas outlet. A nitrogen purge was maintained throughout the course of the reaction. The flask was cooled with an ice bath and phenyl isocyanate (66.2 g, 0.556 mol) was placed in the dropping funnel and added dropwise to the stirred solution. When addition of the phenyl isocyanate was nearly complete, a white solid began to crystallize. The mixture was allowed to warm slowly to room temperature and stirred overnight. The solid was removed by filtration under nitrogen and dried under vacuum. The product (85.0 g, 0.195 mol, 70%) was recrystallized to constant m.p. (107°) from dichloromethane-ether. An nmr spectrum of the recrystallized product shows an aromatic multiplet(-1OH, Ph) at about $\delta$ 7.02, triplet (8H, Py 2.5) at 2.90 a triplet (8H, Py$_{3,4}$) at 1.59 and a sharp singlet (6H,Si$_1$) at 0.40. From the nmr spectrum, the purity of compound G-0 is judged to be 95% with the only impurity being the urea, HNPhC(O)NC$_4$H$_8$.

8. UrR$_2{}^3$Si(OSiR$_2{}^4$)$_q$ Ur wherein R$^3$ and R$^4$ are methyl groups and q equals 1   (G-1)

1,3-Bis(N-pyrrolidino-N'-phenylureido) tetramethyldisiloxane.

The intermediate compound in the synthesis of compound G-1, 1,3-bis(pyrrolidinyl)-tetramethyldisiloxane (b.p., 145°/21 mm, 60% yield) was prepared by direct reaction of 1,3-(dichloro) tetramethyldisiloxane (Silar) with pyrrolidine in heptane solvent. The nmr spectrum of this colorless liquid intermediate (neat with internal TMS) showed a triplet (8H,Py$_{2,5}$) at $\delta$ 2.98, a triplet (8H,Py$_{3,4}$) at 1.67 and a sharp singlet (12H,Si$_1$) at 0.04. Following the same procedure described for G-0 above, the addition of phenyl isocyanate to bis(pyrrolidinyl)-tetramethylidisiloxane resulted in the formation of the solid, compound (G-1), (m.p., 105°), in 81% yield. The similar solubilities of compound (G-1) and urea impurity (identified by nmr as HNPhC(O)NC$_4$H$_8$ made it impossible to obtain this compound pure even after several recrystallizations from toluene. The nmr spectrum compound G-1 showed a multiplet (1OH,Ph) at $\delta$ 7.10 a triplet (8H,Py$_{2,5}$) at 2.97, a triplet (8HPy$_{3,4}$) at 1.63 and a sharp singlet (12H, Si$_1$) at 0.08. The nmr spectrum indicated that compound (G-1) was obtained in 93% purity.

9. UrR$_2{}^3$Si(OSiR$_2{}^4$)$_q$ Ur wherein R$^3$ and R$^4$ are methyl groups and q is 2   (G-2)

1,5-Bis(N-pyrrolidino-N'-phenylureido)hexamethyltrisiloxane compound (G-3) was synthesized from the corresponding dichloro trisiloxane as described for (G-1). The intermediate compound 1,5-bis(pyrrolidino)-hexamethylitrisiloxane, purified by vacuum distillation (b.p., 170°/27 mm), was obtained as colorless liquid in 51% yield. The nmr spectrum of this compound (neat liquid with internal TMS) showed a triplet (8H,Py$_{2,5}$) at $\delta$ 2.96, a triplet (8H, Py$_{3,4}$) at 1.65 and two sharp singlets at 0.06 (12H,Si$_1$) and 0.00(6H,Si$_2$). The addition of 2 mole equivalents of phenyl isocyanate to the liquid bis(pyrrolidinyl)hexamethyltrisiloxane resulted in the formation of a solid (m.p., 134°), (55% yield,) identified as compound (G-2) by its nmr spectrum; aromatic multiplet (1OH,Ph) at $\delta$ 7.53, a triplet (8H,Py$_{2,5}$) at 3.01, a triplet (8H,Py$_{3,4}$) at 1.64 and two sharp single at 0.27 (12H,Si$_2$) and $-0.32$(6H,Si$_2$). The product was obtained in 92% purity following a recrystallization from pentane and toluene.

10. UrR$_2{}^3$Si(OSiR$_2{}^4$)$_q$ Ur wherein R$^3$ and R$^4$ methyl groups and q equals 3   (G-3)

1,7-Bis(N-pyrrolidino-N'-phenylureido-octamethyl-tetrasiloxane, compound G-3, was prepared from the corresponding (dichloro) octamethyltetrasiloxane (Silar) by the procedure described for compound (G-1). The intermediate compound, 1,7-bis(pyrrolidinyl)-octamethyltetrasiloxane, purified by vacuum distillation (b.p., 240°/13 mm), was obtained as a colorless liquid in 52% yield. The nmr spectrum of this compound (50% by volume in CDCl$_3$ with internal TMS) showed a triplet (8H, Py$_{2,5}$) at $\delta$ 2.98 a triplet (8H,Py$_{3,4}$) at 1.70, and two sharp singlets at 0.09 (12H,Si$_1$) and 0.04 (12H,Si$_2$). The addition of 2 mole equivalents of phenyl isocyanate to the liquid bis(pyrrolidinyl) tetrasiloxane resulted in the formation of compound (G-3), which was obtained in 50% yield following vacuum distillation (204°/14 mm). This compound is a viscous oil which slowly solidifies upon standing in vacuo at room temperature. The nmr spectrum of the compound (50% by volume in CDCl$_3$ with internal TMS) showed an aromatic multiplet (1OH,Ph) at $\delta$ 7.06, two triplets at 3.02 (8H,Py$_{2,5}$) and 1.63, 8H,Py$_{3,4}$), and two sharp singlets at 0.31 (12H,Si$_1$) and $-0.17$ (12H,Si$_2$). Like the other bis(ureido) siloxanes this compound was contaminated by urea (10%).

11. (PcSiOSiR'Ph(OSiR$_2{}''$)$_n$OSiR'PhO)$_x$ wherein R' and R'' are methyl groups and n equals 2   (I-2)

Xylene (100 ml) was distilled under nitrogen into a 200 ml 3-neck flask equipped with a nitrogen gas inlet, a stopper, and a magnetic stir bar. A nitrogen purge was initiated and compound D (2.01 g, 2.37 mmol) was added to the flask. One neck of the flask was fitted with a septum while the stopper was replaced by a water-cooled condenser with drying tube gas outlet. Under a nitrogen atmosphere, a solution of compound (G-1) was prepared by dissolving 1.540 g in 10.00 ml of tetrachloroethane. A calculated stoichiometric amount of this solution (1.88 ml) contained 1.214 g or 2.37 mmol) compound (G-1) was then injected into the reaction flask. The reaction mixture was heated to reflux and stirred 1 hour. Because the nmr spectrum of compound (G-1) showed it contained several percent urea impurity eight more increments (0.079 ml, 0.012 g, 0.024 mmol, or about 1% of the stoichiometric amount necessary for complete reaction) of the bis(ureido) siloxane solution were added to the refluxing reaction mixture, one every 30 minutes. About 30 minutes following the final addition of compound (G-1) the reaction mixture was opened to the atmosphere and allowed to cool to room temperature. The product was precipitated slowly by pouring the reaction mixture into 1 liter of stirred methanol. The blue solid (1.95 g, 1.99 mmol, 84%, $\eta_{red}$ 0.10) was filtered and solvent was removed in vacuo. The bands in the infrared spectrum of compound I-2 were: 3078w, 2968w 2598w, 1616m, 1594w, 1525s, 1478m, 1434s, 1410m, 1359m, 1340s, 1297s, 1264s, 1172m, 1128s, 1084–1008vs (broad), 920m, 858m, 810s, 768m, 740s, 706m, 654w, 588m, 545m, 492m, 328w. ANAL. calcd for $C_{50}H_{44}N_8O_5Si_5$: C, 61.43; H, 4.56; Si, 14.36, Found, C, 61.17; H, 4.49; N, 11.33; Si, 14.14. Nmr analysis indicated a $\overline{DP}$ (degree of polymerization) of 14 corresponding to an $M_n$ of $1.4 \times 10^4$.

12. (PcSiOSiR'Ph(OSiR"$_2$)$_n$ OSiR'PhO)$_x$ wherein R' and R" are methyl groups and n equals 3     (I-3)

(PcSiOSiMePh(OSiMe$_2$)$_3$ OSiMePhO)

This polymer was prepared by the reaction of compound D and compound (G-2) in toluene utilizing the procedure described for compound (I-2). A typical reaction utilized compound D (0.997 g, 1.18 mmol) and compound (G-2) (0.699 g, 1.19 mmol) and gave 1.05 g compound (I-3) (1.01 mmol, 86%, $\eta_{red}$ 0.13). The bands in the ir spectrum of compound (I-3) are: 3078w, 2868w, 2598w, 1616m, 1594w, 1524s, 1477m, 1433s, 1413m, 1359m, 1338s, 1296s, 1263s, 1172m, 1128s, 1083–1005vs, (broad), 918m, 855m, 809s, 768m, 738s, 706m, 588m, 544m, 490m, 440m, 328w, ANAL. calcd for $C_{52}H_{50}N_8O_6Si_6$: C, 59.40; H, 4.79; N, 10.66; Si, 16.03 Found, C, 59.69, H, 4.82; N, 10.57; Si, 16.11. Nmr analysis indicated a $\overline{DP}$ of 11 corresponding to an $M_n$ of $1.2 \times 10^4$.

13. (PcSiOSiMePh(OSiMe$_2$)$_3$ OSiMePhO)
    (aminosiloxane method)     (I-3)

A three necked 150 ml flask was equipped with a septum stopper, magnetic stir bar, gas inlet and outlet for dry nitrogen and water cooled condenser. Under a stream of dry nitrogen (which was continued throughout the reaction) 100 ml toluene (distilled from Na) was added to the flask. 1, 3-dimethylamidohexamethyl trisiloxane (1.7 ml, 1.49 g, 5.05 mmol) was added to the flask. Finally, PcSi(OSi(CH$_3$) (C$_6$H$_5$)OH)$_2$ (compound D, 4.30 g, 5.08 mmol) was added. Heating was initiated and within 20 minutes the mixture was at mild reflux (105° C.). Compound D slowly dissolved as the reaction proceeded. After 1 hr at reflux the inherent viscosity was determined to be 0.095. A solution was then prepared containing 0.5854 g of trisiloxane in 2 ml toluene. Part of this solution (0.026 ml, 0.15 mol % based on trisiloxane) was injected into the refluxing mixture. Thirty minutes later the inherent viscosity of the reaction mixture was 0.119. Another addition of trisiloxane solution (0.026 ml) caused no increase in solution viscosity. Heating was terminated (3 hr total reaction time) and the mixture was poured into 2 liters of methanol.

The resulting solid product was dissolved in CH$_2$Cl$_2$ and reprecipitated from methanol. The solid blue product weighed 2.11 g (3.97 mmol, 78.6% yield). The polymer melted at 65–70° and gave an expected $^1$H nuclear magnetic resonance spectrum. The reduced viscosity measured in chloroform at 20° C. was 0.15. Analysis Theory: %C, 59.40; %H, 4.79; %N, 10.66; %Si, 16.03. Found: %C, 59.69; %H, 4.82; %N, 10.57; %Si, 16.11. A gell permeation chromatogram (GPC) of the polymer gave an $M_n$ of approximately $1.8 \times 10^4$.

$^1$H nmr data taken together with the GPC indicated that polymer I-3 has higher purity and higher molecular weight than I-3 prepared by the ureido route. In addition, aminosilanes are more easily synthesized and are more readily obtainable in higher purity than ureido silanes. Therefore the aminosilane route is preferred when these considerations are of importance. The ureido silane method would be preferred when a polymer terminated with the highly reactive ureido group is desired, as for example when the phthalocyanine-siloxane polymer is to be further incorporated into a block copolymer. The experimental data taken on samples of the polymers of this invention have excellent thermal stability at 300° C. These polymers display an intense purple to blue color in the solid state and are readily soluble in polar organic solvents to which they impart a deep purple to blue color even in dilute solutions.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A silicon-phthalocyanine siloxane polymer having the formula:

(PcSiOSiR'Ph(OSiR"$_2$)$_n$ OSiR'PhO)$_x$ wherein Pc is a phthalocyanine nucleus, Ph is a phenyl group, n is an integer from 1 to 8, R' and R" as alkyls having from 1 to 8 carbon atoms, and x is from 1 to 20.

2. The polymers of claim 1 wherein R' and R" are alkyls having from 1 to 3 carbon atoms.

3. The polymer of claim 1 wherein n is an integer from 2 to 4.

4. The polymer of claim 3 wherein R' and R" are methyl groups.

5. The polymer of claim 2 wherein n equals 1.

* * * * *